(12) United States Patent
Ulrich et al.

(10) Patent No.: US 8,502,106 B2
(45) Date of Patent: Aug. 6, 2013

(54) WELDING SYSTEM AND METHOD HAVING POWER CONTROLLER WITH WORKPIECE SENSOR

(75) Inventors: Mark Ulrich, New London, WI (US); Sean Moran, Neenah, WI (US); Paul Leitermann, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2008 days.

(21) Appl. No.: 11/434,391

(22) Filed: May 15, 2006

(65) Prior Publication Data

US 2007/0262058 A1  Nov. 15, 2007

(51) Int. Cl.
*B23K 9/20* (2006.01)

(52) U.S. Cl.
USPC .............................. 219/98; 219/99

(58) Field of Classification Search
USPC ....................................... 219/98, 99
See application file for complete search history.

(56) References Cited

U.S. PATENT DOCUMENTS

| | | | | |
|---|---|---|---|---|
| 3,932,724 A | * | 1/1976 | Raycher | 219/98 |
| 4,117,298 A | * | 9/1978 | Raycher | 219/98 |
| 4,467,174 A | | 8/1984 | Gilliland | |
| 4,514,615 A | | 4/1985 | Simoneau et al. | |
| 4,689,462 A | * | 8/1987 | Goto | 219/69.12 |
| 5,151,841 A | | 9/1992 | Knights | |
| 5,321,226 A | * | 6/1994 | Raycher | 219/98 |
| 5,436,427 A | | 7/1995 | Bourque | |
| 5,513,093 A | | 4/1996 | Corrigall | |
| 5,615,095 A | | 3/1997 | Reynolds et al. | |
| 5,676,867 A | | 10/1997 | Van Allen | |
| 6,333,489 B1 | | 12/2001 | Reynolds | |
| 6,548,784 B2 | | 4/2003 | Sammons et al. | |
| 6,713,708 B2 | * | 3/2004 | Hedberg | 219/98 |
| 6,770,846 B2 | | 8/2004 | DeCoster | |
| 6,809,293 B2 | | 10/2004 | Sammons et al. | |
| 7,109,434 B2 | * | 9/2006 | Willershausen | 219/99 |
| 7,141,753 B2 | * | 11/2006 | Kondo et al. | 219/99 |

(Continued)

FOREIGN PATENT DOCUMENTS

| | | |
|---|---|---|
| EP | 1595635 | 11/2005 |
| JP | 04279280 | 10/1992 |
| JP | 7-136766 A  * | 5/1995 |
| WO | WO0292271 | 11/2002 |

OTHER PUBLICATIONS

Machine Generated English Translation of JP7-136766A.*
Translation of Japan Patent No. 07-136,766, Mar. 2010.*

(Continued)

*Primary Examiner* — Geoffrey S Evans
(74) *Attorney, Agent, or Firm* — Fletcher Yoder P.C.

(57) ABSTRACT

A welding system and method having power controller with workpiece sensor. In some embodiments, the welding system includes a stud welding power supply having a welding power output, a stud welding power controller, and a workpiece sensor. The stud welding power controller may be communicatively coupled to the stud welding power supply and the workpiece sensor. In certain embodiments, the stud welding power controller is responsive to a signal from the workpiece sensor indicative of a position of a stud in general proximity or engagement with a workpiece.

15 Claims, 6 Drawing Sheets

U.S. PATENT DOCUMENTS

| | | | |
|---|---|---|---|
| 7,170,026 B2 * | 1/2007 | Nakagami | 219/99 |
| 7,282,661 B2 | 10/2007 | Ulrich et al. | |
| 2004/0050826 A1 * | 3/2004 | Citrich et al. | 219/99 |
| 2004/0056005 A1 * | 3/2004 | Willershausen | 219/98 |
| 2004/0245219 A1 * | 12/2004 | Moran et al. | 219/98 |
| 2005/0111932 A1 * | 5/2005 | Albrecht et al. | 411/171 |
| 2006/0086696 A1 * | 4/2006 | Ulrich et al. | 219/98 |
| 2006/0118534 A1 * | 6/2006 | Casner et al. | 219/130.21 |

OTHER PUBLICATIONS

Omer W. Blodgett, et al., "Welding and Cutting", Chapter 13.3—Arc Welding, *Marks' Standard Handbook for Mechanical Engineers*, McGraw-Hill, pp. 13-24 through 13-45, copyright 1996.

* cited by examiner

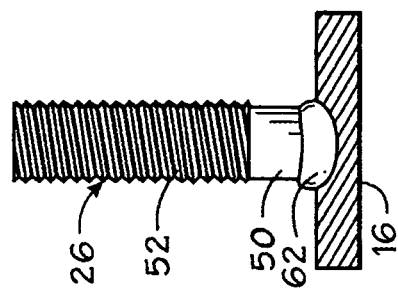
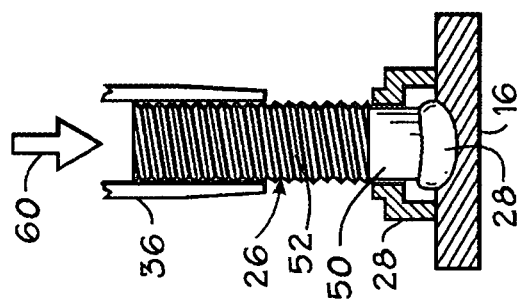
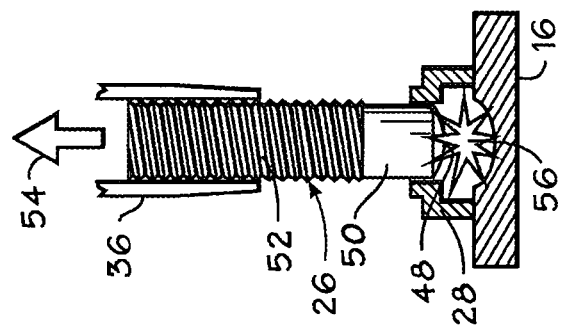
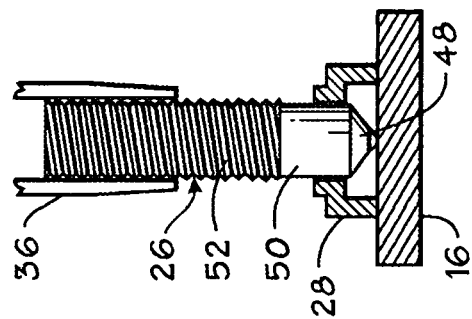

WELDING SYSTEM AND METHOD HAVING POWER CONTROLLER WITH WORKPIECE SENSOR

BACKGROUND

The present invention relates generally to welding devices and, in certain embodiments, to welding devices having a low open circuit voltage.

Electric welding systems typically employ an electrode and a power source to weld a workpiece. Generally, the workpiece is connected to a first lead of the power source and the electrode is connected to a second, differently charged lead of the power source. To initiate welding, the electrode is typically brought near the workpiece, and an electric arc is struck over an air gap between the electrode and the workpiece. The electric arc converts electric energy into thermal energy, which liquefies metal proximate the electrode. In some forms of welding, the electric arc also melts metal in the electrode, thereby consuming the electrode.

In general, welding systems conduct a welding current through the electrode upon activation by a trigger. The welding systems are generally unaware of the presence or absence of a workpiece or the type of object near the electrode.

BRIEF DESCRIPTION

The following discussion describes, among other things, a welding system and method having power controller with workpiece sensor. In some embodiments, the welding system includes a stud welding power supply having a welding power output, a stud welding power controller, and a workpiece sensor. The stud welding power controller may be communicatively coupled to the stud welding power supply and the workpiece sensor. In certain embodiments, the stud welding power controller is responsive to a signal from the workpiece sensor indicative of a position of a stud in general proximity or engagement with a workpiece.

DRAWINGS

These and other features, aspects, and advantages of the present invention will become better understood when the following detailed description is read with reference to the accompanying drawings in which like characters represent like parts throughout the drawings, wherein:

FIGS. 3-6 are diagrammatical illustrations of an exemplary stud welding process in accordance with an embodiment of the present technique;

DETAILED DESCRIPTION

As discussed in detail below, some of the embodiments of the present technique provide a method and apparatus for preventing a welding system from applying welding current and/or welding voltage to non-workpiece objects. Of course, such embodiments are merely exemplary of the present technique, and the appended claims should not be viewed as limited to those embodiments. Indeed, the present technique is applicable to a wide variety of systems.

Figure 1:
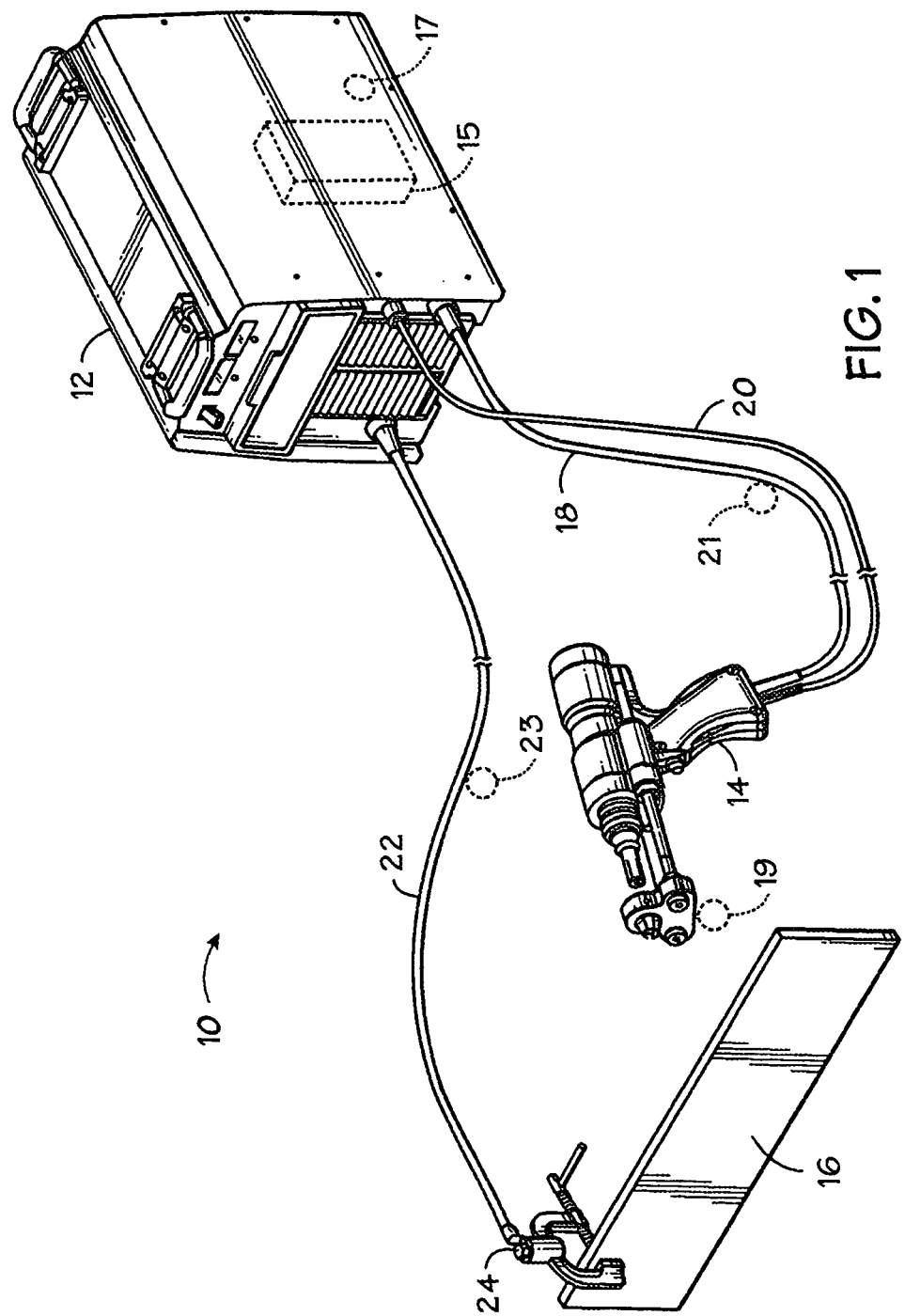
FIG. 1 is perspective view of an exemplary welding system in accordance with an embodiment of the present technique.

FIG. 1 depicts an exemplary welding system 10. The present exemplary welding system 10 includes a stud welding power control unit 12 (hereinafter "power control unit"), a stud welding gun 14, and a workpiece 16. As explained below, the power control unit 12, in some embodiments, may be configured to conduct a test current through a stud and measure some electrical parameter indicative of contact between the stud and a workpiece, such as voltage of the stud. In certain embodiments, the power control unit 12 may output welding power only after a signal indicates the stud is contacting the workpiece 16. In other words, the power control unit 12 may rely on one or more sensed parameters or feedback to control the output power to the welding gun 14, thereby substantially reducing or eliminating the possibility of a normal welding power state without a corresponding workpiece 16 adjacent the welding gun 14. The normal welding power state or welding power may be defined as a power level within a range sufficient to perform a welding operation. The test current or test power state may be defined as a current or power level below (e.g., substantially below) the normal welding power state. The power control unit 12 may, in some embodiments, include electronics 15 to perform some of these functions, such as a subsequently discussed power supply and power supply controller. The welding system 10 may also include a subsequently described workpiece sensor disposed in one or more of a variety of locations, such as locations 17, 19, 21 and/or 23.

In the present embodiment, the exemplary welding system 10 includes a weld cable 18, a control cable 20, a ground cable 22, and a clamp 24. While the present weld cable 18 and control cable 20 are depicted as separate cables, in some embodiments the cables 18 and 20 may be bundled or split into additional cables.

When the exemplary welding system 10 is assembled, the weld cable 18 and the control cable 20 may independently electrically couple the stud welding gun 14 to the power control unit 12. The power control unit 12 may electrically connect to the workpiece 16 through the ground cable 22, which may be removably coupled to the workpiece 16 by the clamp 24. Together, in the present embodiment, these components may complete an electrical circuit, as explained below.

It should also be noted that, while the present welding system 10 is a stud welding system, other types of welding systems are within the scope of the present technique, such as electric arc welding systems, shielded metal arc welding systems, metal inert gas welding systems, and/or submerged arc welding systems, for instance.

In operation, the welding system 10 may be used to weld a metal fastener (hereinafter "stud") to the workpiece 16. As is explained in reference to FIGS. 3-6, the stud welding gun 14 may position a stud on the workpiece 16. After determining if the stud is in contact with or near the workpiece 16, stud welding gun 14 may lift the stud a short distance from the workpiece 16, and the power control unit 12 may drive current through the stud. Otherwise, if the power control unit 12 does not sense that the stud is in contact with or near the workpiece 16, then the normal welding power is not allowed or provided by the power control unit 12. Current may flow from/to the power control unit 12 through the weld cable 18. The electric current may arc between the workpiece 16 and the stud, thereby melting metal in the stud and the workpiece 16. The ground cable 22 may conduct current between the workpiece 16 and the power control unit 12 through the clamp 24. Together, these components may complete the welding current circuit of the present embodiment.

Additionally, the control cable 20 may carry a control current between the stud welding gun 14 and the power control unit 12. The control current may energize components in the stud welding gun 14 that position a stud relative to the workpiece 16. These components, which are described below, may lift the stud during arcing and plunge the stud into the resulting pool of liquid metal, thereby securing the stud to the workpiece 16.

Figure 2:
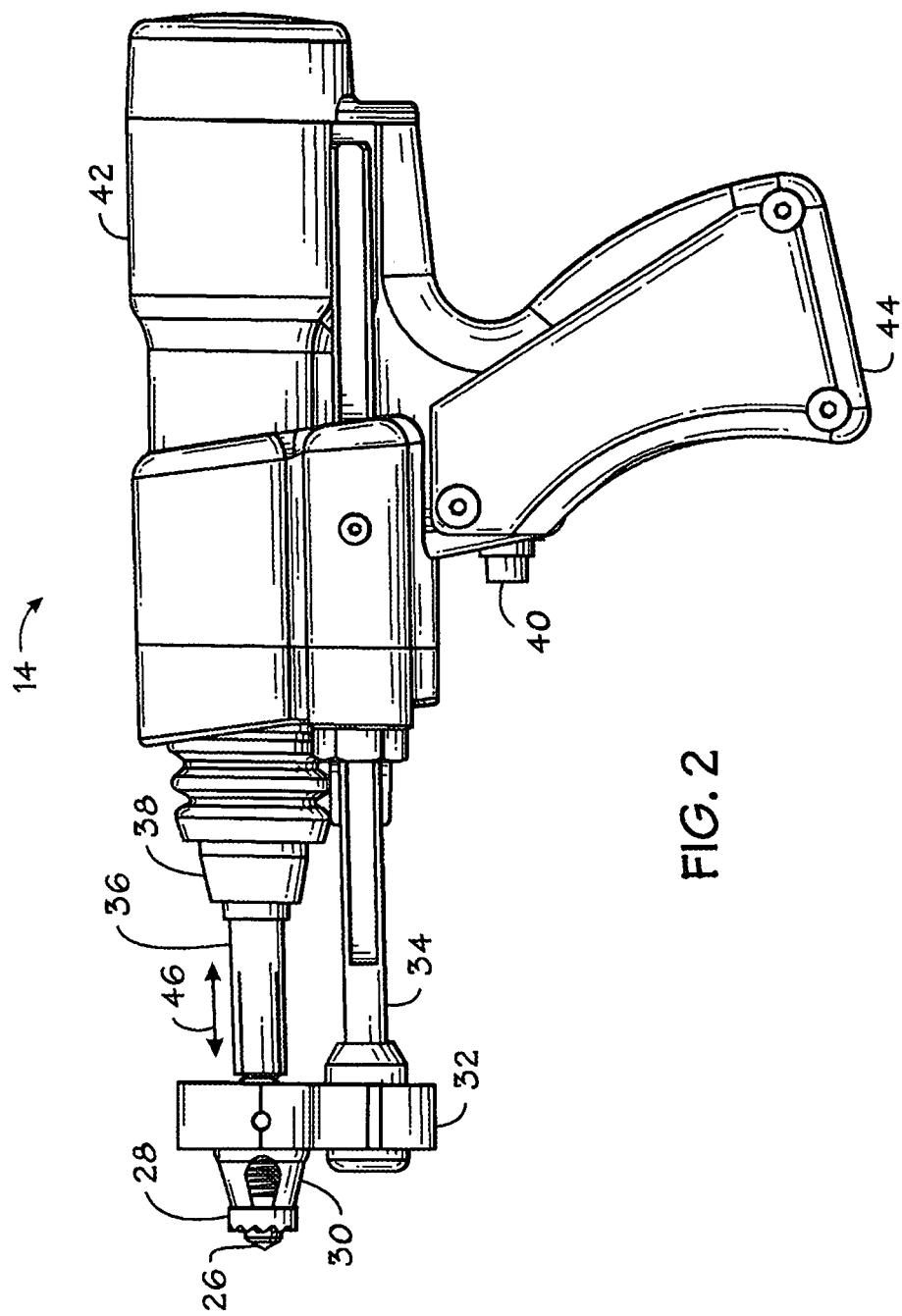
FIG. 2 is a side view illustration of an exemplary stud welding gun in accordance with an embodiment of the present technique.

FIG. 2 depicts the exemplary stud welding gun 14 in greater detail. The present stud welding gun 14 may include a stud 26, a ferrule 28, a ferrule grip 30, a foot 32, legs 34, and a chuck adapter 38. Additionally, the exemplary stud welding gun 14 may include a trigger 40, a stud drive 42, and a handle 44. The stud drive 42 may include components (e.g., a main spring and a solenoid) adapted to produce a linear displacement or other displacement of the stud 26. The present stud welding gun 14 is a manual stud welding gun. Embodiments in accordance with the present technique may further include an automatic production gun, a positioning device, an automatic stud loading system, and/or a factory automation system, for example. The stud 26 may include conductive materials and have a generally cylindrical or otherwise elongated shape. Of course, the present technique is not limited to studs 26 with any particular shape. In some embodiments the stud 26 may include flux.

In the present stud welding gun 14, the ferrule 28 may be removably secured to the ferrule grip 30. The ferrule grip 30, in turn, may be removably secured to the foot 32, which may be held in spaced relation to the handle 44 by legs 34. Additionally, in the current embodiment, the stud 26 is removably coupled to the chuck 36, which is removably coupled to the chuck adaptor 38. The stud drive 42 may connect to the chuck adaptor 38 and to the handle 44.

In operation, when the ferrule 28 is pressed against the workpiece 16, a compressive force may be transmitted from the handle 44, through the legs 34, into the foot 32 and through the ferrule grip 30 to the ferrule 28. The compressive force from the handle 44 may press the ferrule 28 against the workpiece 16, thereby, in some embodiments, stabilizing the stud welding gun 14 at a static location on the workpiece 16. The present ferrule grip 30 may be removed from the foot 32 and replaced with a different sized ferrule grip 30 to accommodate different sized ferrules 28.

Once the ferrule 28 is pressed against the workpiece 16, various moving parts may position the stud 26 relative to the workpiece 16. For instance, the stud drive 42 may linearly position the stud 26 relative to the workpiece 16, as is depicted by arrows 46. In embodiments in which the stud drive 42 includes a solenoid and a main spring, a control current transmitted through the control cable 20 from the power control unit 12 may energize the solenoid. In these embodiments, the solenoid may compress the main spring 12 and lift the stud 26. When the solenoid is de-energized, the main spring may plunge the stud 26 back into the workpiece 16. Movement of the stud drive 42 may be transmitted to the stud 26 through the chuck 36 and the chuck adapter 38. In some embodiments, chuck 36 may be removed and replaced with different sized chucks 36 to accommodate different sized studs 26.

Several stages of an exemplary stud welding operation are depicted by FIGS. 3-6. As illustrated by FIG. 3, the stud 26 may be initially positioned at a specific location on the workpiece 16. In some embodiments, the stud 26 is pressed against the workpiece 16 by slightly compressing the main spring in the stud drive 42. The ferrule 28 may also be pressed against the workpiece 16 in an area surrounding or near the stud 26. The present exemplary stud 26 includes a tip 48 that may contact the workpiece 16, a non-threaded portion 50, and a threaded portion 52. The exemplary stud 26 may be secured by the chuck 36. At this point, the welding system 10 may ensure that the stud 26 is in contact with the workpiece 16 before proceeding, as is explained in more detail below.

Turning to FIG. 4, after positioning the stud 26 on or near the workpiece 16, welding may begin after the power control unit 12 senses or receives feedback that the stud 26 is on or near the workpiece 16. Otherwise, without the correct feedback, the power control unit 12 may prevent or request a secondary act to provide welding power to perform the stud welding procedure. In the present embodiment, after receiving the correct feedback at the power control unit 12, a solenoid in the stud drive 42 may be energized, thereby compressing the main spring and lifting the chuck 36. As the chuck 36 lifts, the stud 26 may rise perpendicularly from the workpiece 16, as depicted by arrow 54. Of course other embodiments may not employ these components to position the stud 26, or may not employ these components to position the stud 26 in this way, or may not include some or all of these components. For example, other embodiments may include some type of electrode other than a stud 26. As the stud 26 is lifted, the stud 26 may slide within the ferrule 28, and the ferrule 28 may stay in contact with or near the workpiece 16. Alternatively, other embodiments may move the ferrule 28 or not include a ferrule 28, which is not to imply that other features discussed herein may not also be omitted in accordance with the present technique. Before, at approximately the same time, or after lifting 54 the stud 26, the welding system 10 may form an electric potential between the stud 26 and the workpiece 16 (hereinafter a source voltage, or $V_s$). A welding current may flow to/from the power control unit 12, through the weld cable 18, through the stud 26 and into/from the workpiece 16 across an arc 56. In the present embodiment, the arc 56 heats the metal in the stud 26 and the workpiece 16 and causes localized melting. The ferrule 28 may confine the heat and liquid metal near the tip 48 of the stud 26.

FIGS. 5 and 6 illustrate the completion of a successful stud welding operation. FIG. 5 depicts the re-application of the stud 26 to the workpiece 16. In the current embodiment, after a pool of molten metal 58 has been formed near the tip 48 of the stud 26, the stud drive 42 may plunge the stud 26 into the molten pool 58, as depicted by arrow 60. Finally, as depicted by FIG. 6, the molten pool 58 freezes, thereby forming a weld 62 between the stud 26 and the workpiece 16. At this point, the chuck 36 may be detached from the stud 26, and the ferrule 28 may be removed from the stud 26. The stud 26 may be generally permanently secured to the workpiece 16. Another stud 26 may be placed in the chuck 36, and the process depicted by FIGS. 3-6 may be repeated at another location on the workpiece 16.

Again, certain embodiments discussed in more detail below may detect if the stud 26 is in contact with or near the workpiece 16 before driving a current through the stud 26, thereby potentially avoiding driving a current through non-workpiece objects. Further, some of these embodiments may avoid exposing non-workpiece objects to voltages appropriate for driving a welding current.

Figure 7:
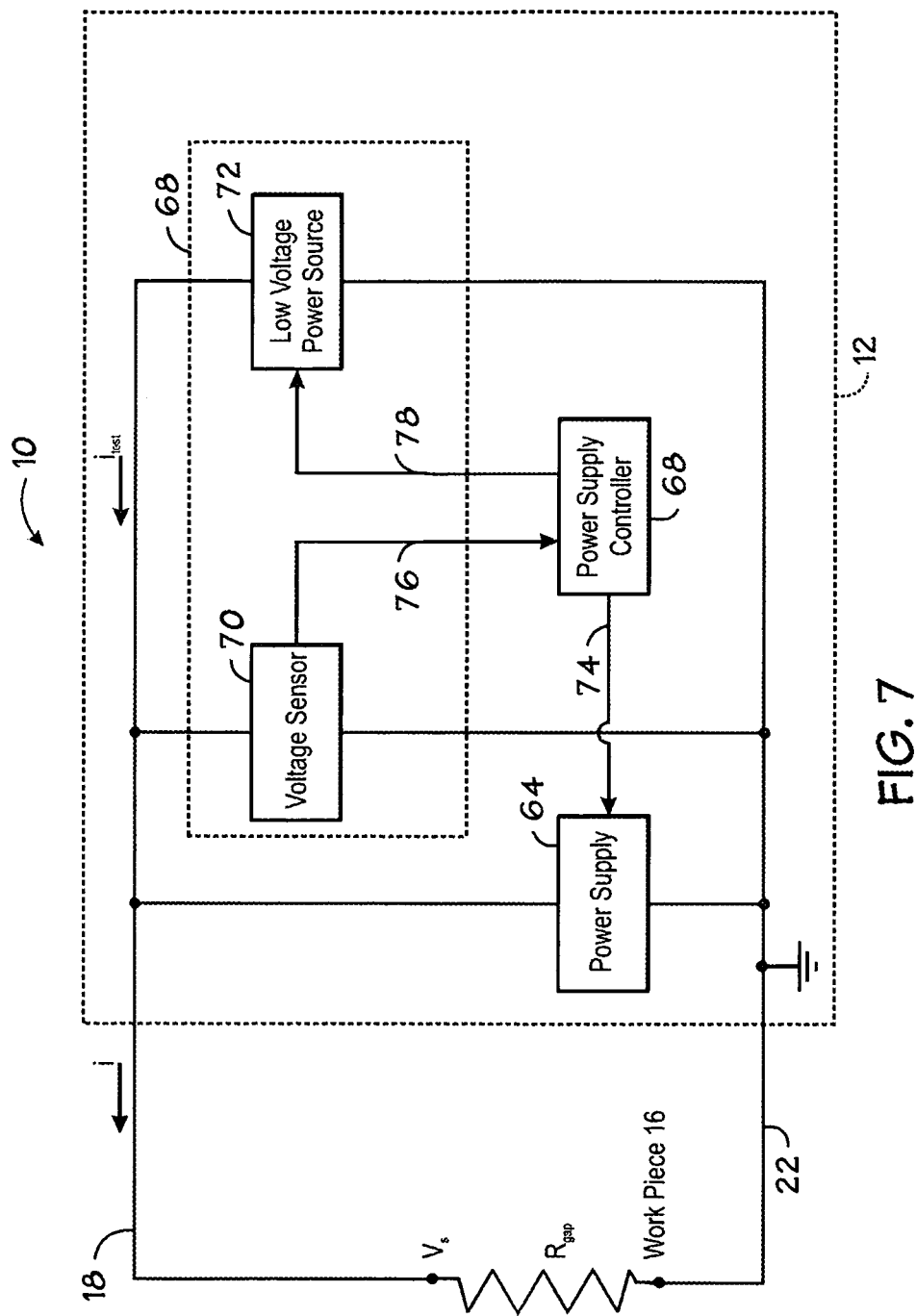
FIG. 7 is a diagrammatic representation of the exemplary welding system of FIG. 1 in accordance with an embodiment of the present technique.

FIG. 7 is a diagrammatic representation of the welding system 10. The source voltage, i.e., the electric potential between stud 26 and the workpiece 16, is depicted by $V_s$ and the voltage of the workpiece 16 is illustrated by a node labeled workpiece 16. The resistance between the stud 26 and the workpiece 16 is represented by a resistor labeled $R_{gap}$. The current through the weld cable 18 is labeled i.

The power control unit 12 of the current embodiment may include a power supply 64, a power supply controller 66, and a workpiece sensor 68. While these components are depicted as part of the power control unit 12 in the present embodiment, they may be distributed throughout the welding system 10, such as partially or wholly within the stud welding gun 14, for example. Further, in certain embodiments, one or more of these components may be partially or entirely omitted or partially or entirely integrated into another of these components. The power supply 64 may be an inverter power supply, a transformer and rectifier regulated power supply, engine driven power supply, or some other form of power supply configured to deliver and/or regulate a weld current i, for example. In certain embodiments employing a transformer, the transformer may include a primary side and a secondary side. In some embodiments, power supply controller 66 may include a microprocessor or other analog or digital circuit configured to control the operation of the power supply 64 and/or other components of the welding system 10. The power supply controller 66 may include or be part of an in situ or ex situ feed-forward or feedback controller, for example.

The workpiece sensor 68 may include components adapted to sense if stud 26 is contacting or near a workpiece 16. For instance, the workpiece sensor 68 may include a voltage sensor 70 and a low voltage power source 72. The low voltage power source 72 may be partially or entirely integrated into the power supply 64, or it may be a standalone low voltage power supply, for instance. The low voltage power source 64 may output a low open circuit voltage, such as a voltage less than or generally equal to 40 volts, 35 volts, 30 volts, 25 volts, 20 volts, 15 volts, 10 volts, 9 volts, 8.5 volts, 8 volts, 7 volts, 6 volts, 5 volts, 4 volts, 3 volts, 2 volts, or 1 volt, for example. In some embodiments, the low voltage power source 64 may output current less than or generally equal to 200 milliamps, 100 milliamps, 80 milliamps, 70 milliamps, 60 milliamps, 50 milliamps, 40 milliamps, 30 milliamps, 20 milliamps, or milliamps, for example. Alternatively, or additionally, the workpiece sensor 68 may include a low voltage power source and an impedance sensor, a current sensor, or some other sensor configured to detect feedback indicative of if the low voltage power source 72 is electrically connected to the workpiece 16. In other embodiments, the workpiece sensor 68 may sense other parameters indicative of proximity of the workpiece 16 to the stud 26. For example, the workpiece sensor 68 may include an optical sensor, a capacitance sensor, an eddy current sensor, a metal detector, and/or a contact sensor.

As assembled in the current embodiment, the power supply controller 66 may communicatively couple to the power supply 64, which may be electrically coupled to the ground cable 22 and the weld cable 18. The workpiece sensor 68 may be disposed in series between the weld cable 18 and the ground cable 22 and in parallel with the power supply 64 and $R_{gap}$. Alternatively, the workpiece sensor 68 may be disposed partially or entirely elsewhere within the welding system 10, such as in the stud gun 14, depending on the type of workpiece sensor 68. The workpiece sensor 68 and the power supply 64 may communicatively couple to the power supply controller 66. In the present embodiment of a workpiece sensor 68, the voltage sensor 70 is disposed in series between the weld cable 18 and the ground cable 22 and in parallel with the power supply 64 and $R_{gap}$. Similarly, the low voltage power source 72 may be disposed in series between the weld cable 18 and the ground cable 22 and in parallel with the voltage sensor 70.

The voltage sensor 70, low voltage power source 72, and power supply 64 may be communicatively coupled to the power supply controller 64.

In operation, the power supply controller 66 may control the operation of part or all of the welding system 10. For example, the power supply controller 66 may transmit a welding current control signal 74 to the power supply 64. The welding current control signal 74 may signal the power supply 64 to begin attempting to drive a welding current i or to cease attempting to drive a welding current i, for instance. As the current power supply 64 attempts to drive a welding current i, it may elevate Vs to a welding appropriate voltage, such as greater than 30 volts, 40 volts, 50 volts, 60 volts, 70 volts, 80 volts, 90 volts, 100 volts, 150 volts, 200 volts, or 400 volts, for instance. Additionally, the power supply controller 66, in some embodiments may transmit position control signals on the control cable 20 to position the stud 26 perpendicularly relative to the workpiece 16.

In some embodiments, the power supply controller 66 may prevent the power supply 64 from delivering a welding current i to a non-workpiece object. To this end, the power supply controller 66 may receive a workpiece signal 76 from the workpiece sensor 68. The workpiece signal 76 may indicate if the stud 26 is contacting the workpiece 16 or, in other exemplary embodiments, if the stud 26 is near the workpiece 16. Alternatively, or additionally, the workpiece signal 76 may indicate if the stud 26 is in electrical communication with some specific non-workpiece object, such as a human body for example. In certain embodiments, the power supply controller 66 may prevent the power supply 64 from delivering a welding current i if the workpiece signal 76 indicates that the stud 26 is not contacting the workpiece 16. In other embodiments, the power supply controller 66 may prevent the power supply 64 from deliver a welding current i if the workpiece signal 76 indicates that the stud 26 is not near the workpiece 16 or that the stud 26 is contacting some specific non-workpiece object. The power supply controller 66 may, depending on the embodiment, stop the power supply 64 from delivering a welding current i that it is currently delivering. Alternatively, the power supply controller 66 may disregard the workpiece signal 76 while the power supply 64 is delivering a welding current i, for instance during a pulse of welding current i that lasts less than 3 seconds, 2.5 seconds, 1.5 seconds, 1 second, or 0.5 seconds.

In addition to preventing the power supply 64 from delivering a welding current i in some of these embodiments, the power supply controller 66 may prevent the power supply from applying a welding open circuit voltage to the stud 26 or other components of the welding system 10 as the power supply 64 attempts to drive the welding current i. For instance, the power supply controller 66 may, in some embodiments, prevent the power supply controller 64 from applying an open circuit voltage greater than or equal to 10 volts, 15 volts, 20 volts, 25 volts, 30 volts, 35 volts, 40 volts, 45 volts, 50 volts, 55 volts, 60 volts, 65 volts, 70 volts, 75 volts, 80 volts, 85 volts, 90 volts, 95 volts, or 100 volts to non-workpiece objects.

The power supply controller 66 also may control the operation of the workpiece sensor 68. In the present embodiment, the power supply controller 66 may transmit a control signal 78 to the low voltage power source 72. The control signal 78 may, in some embodiments, cause the low voltage power source 72 to transmit and/or cease transmitting a test current $i_{test}$, embodiments of which are also referred to herein as a "standby current." As the low voltage power source 72 attempts to drive the standby current or test current $i_{test}$, it may also output a standby voltage or test voltage. The value of the test current $i_{test}$ or standby current may be any of the current quantities discussed above in reference to the current output of the low voltage power source 72 or other values. Similarly, the standby voltage or test voltage may be any of the voltage values discussed above in reference to the voltage output of the low voltage power source 72 or other values. In the present embodiment, the test current $i_{test}$ may pass through the welding cable 18 to the stud 26, through the workpiece 16 or a non-workpiece object between the stud 26 and ground, and back through the ground cable 22. At certain points of operation in some embodiments, the power supply controller 66 may signal the low voltage power source 72 to stop attempting to drive $i_{test}$, for instance during welding or if the trigger 40 of the stud gun 14 is pulled and no contact is detected. As discussed below, the test current $i_{test}$ may be used to detect electrical parameters indicative of contact between the stud 26 and the workpiece 16.

The present workpiece sensor 68 may detect if the stud 26 is contacting the workpiece 16. For example, the voltage sensor 70 may sense the voltage drop across $R_{gap}$, which is $V_s$ in the current embodiment, as the low voltage power source 72 attempts to drive the test current $i_{test}$ through the stud 26. If the voltage drop $V_s$ is large, indicating that $R_{gap}$ is small, then the voltage sensor 70 may transmit a workpiece signal 76 indicative of contact with the workpiece 16. In other words, if the voltage sensor 70 detects that stud 26 has made electrical contact with the workpiece 16, the voltage sensor 70 may signal the power supply controller 66 that contact has been made. Often, non-workpiece objects have greater resistance to ground (e.g., $R_{gap}$) than a workpiece 16. Thus, a lower $R_{gap}$ may indicate that the stud 26 is contacting the workpiece 16 and vice versa. Alternatively, if $V_s$ is relatively large, for example above a threshold voltage $V_t$, then the voltage sensor 70 may transmit a workpiece signal 76 that indicates that the stud 26 is not contacting the workpiece 16. That is, if the present voltage sensor determines that $R_{gap}$ is large, then the voltage sensor 70 may signal the power supply controller 66 that the stud is not contacting the workpiece 16. The value of $V_t$ may be selected to ensure a minimum of false positives and indicate a high likelihood of contact with the workpiece 16. For example, $V_t$ may be less than 8 volts, 7 volts, 6 volts, 5 volts, 4 volts, 3 volts, 2 volts, or 1 volt. The comparison of $V_s$ to $V_t$ may be performed by the voltage sensor, the power supply controller 66, or some other component.

Advantageously, welding system 10, in some embodiments, may avoid or generally reduce the possibility of exposing non-workpiece objects to currents greater than $i_{test}$ and to open circuit voltages greater than the open circuit voltage of the low voltage power source 72. When a non-workpiece object that has a higher resistance to ground ($R_{gap}$) is placed between the stud 26 and the workpiece 16, the voltage sensor 70 may detect that $V_s$ is above $V_t$ as the low voltage power source attempts to drive $i_{test}$ through the non-workpiece object. In response, the voltage source 70 may transmit a signal 76 to the power supply controller 66 that indicates that the stud 26 is not contacting the workpiece 16, and the power supply controller 66 may prevent the power supply 64 from attempting to welding current i through the non-workpiece object, at least in some embodiments. Further, by not attempting to drive welding current i, the present power supply 64 may not apply a welding voltage to the non-workpiece object. Additionally, in certain embodiments, the welding system 10 may be capable of delivering a welding current i when $i_{test}$ flows into the workpiece 16 with little resistance. In summary, in the present embodiment, the welding system 10 detects if the stud 26 is contacting the workpiece with a small, low voltage test current $i_{test}$ before driving a welding current i with an open circuit voltage that is appropriate for welding.

Figure 8:
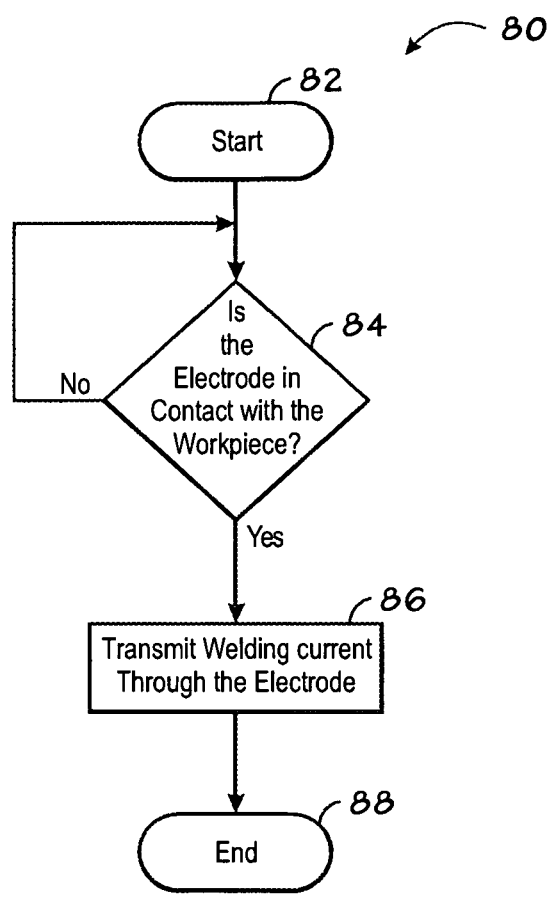
FIG. 8 is a flowchart depicting an exemplary welding process in accordance with an embodiment of the present technique.

FIG. 8 depicts an exemplary welding process 80. The present exemplary welding process 80 begins, as depicted by block 82, with pulling a trigger 40 on a stud gun 14. Next, it is determining if the electrode is in contact with the workpiece 16, as depicted by block 84. If the electrode is not in contact with the workpiece 16, then the step of determining if the electrode is contacting the workpiece 16 may be repeated, thereby waiting until the electrode is in contact with the workpiece 16. In alternative embodiments, the welding process 80 may end at this point. On the other hand, if it is determined that the electrode is contacting the workpiece 16, then a welding current may be driven through the electrode to perform a welding procedure, as depicted by block 86, and the process may subsequently end, as depicted by block 88.

Figure 9:
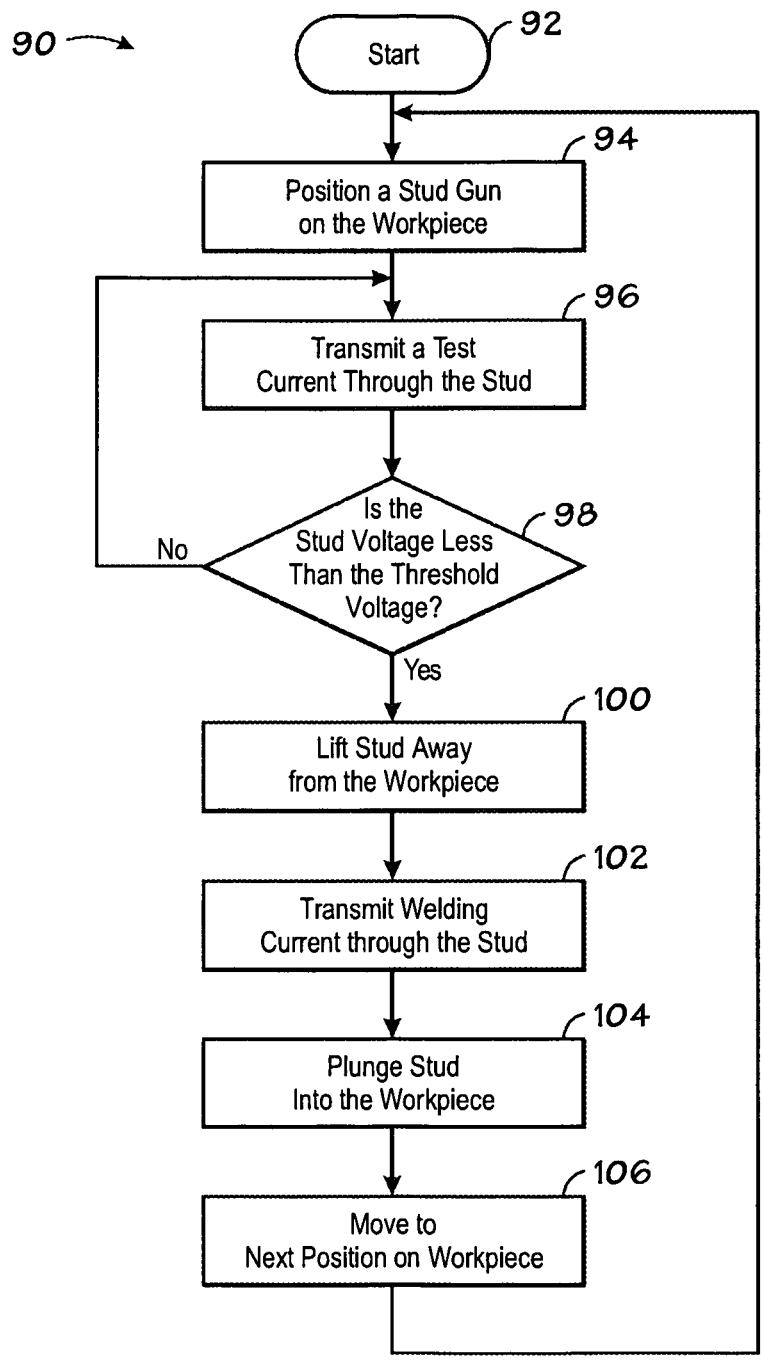
FIG. 9 is a flowchart depicting another exemplary welding process in accordance with an embodiment of the present technique.

FIG. 9 depicts another exemplary welding process 90. The exemplary welding process 90 begins, as depicted by block 92, with positioning a stud gun 14 on the workpiece 16. In the present embodiment, the stud gun 14 may be statically positioned on the workpiece 16 during a number of the following steps. In addition to positioning a stud gun 14 on the workpiece 16, the trigger 40 of the stud gun 14 may be pulled, in some embodiments. Next, a test current $i_{test}$ may be transmitted through the stud 26, as depicted by block 96, and it may be determined if the voltage of the stud 26 ($V_s$) is less than the threshold voltage $V_t$. Measuring resistance to the flow of test current $i_{test}$ may provide feedback indicative of contact between the stud 26 and the workpiece 16. Conditioning the provision of welding power on such feedback may reduce the likelihood of attempting to provide welding power without the workpiece 16. If $V_s$ is greater than $V_t$, then $i_{test}$ may continue being transmitted to the stud, or, in other embodiments, the welding process 90 may terminate along with $i_{test}$. If, on the other hand, $V_s$ is less than or equal to $V_t$, then $i_{test}$ may cease being transmitted, and the stud 26 may be lifted perpendicularly from the workpiece 16, as depicted by block 100. A welding current i may be driven through the stud 26, as depicted by block 102, and the stud 26 may be plunged back into the workpiece 16, as depicted by block 104. Finally, the stud gun 14 may be moved to another position on the workpiece 16, and the exemplary welding process 90 may be repeated.

The invention claimed is:

1. A stud welding device, comprising:
   a stud welding power supply having a welding power output;
   a stud welding power controller communicatively coupled to the stud welding power supply; and
   a workpiece sensor communicatively coupled to the stud welding power controller, wherein the stud welding power controller is responsive to a signal from the workpiece sensor indicative of a position of a stud in general proximity or engagement with a workpiece, wherein the workpiece sensor, or the stud welding power controller, or a combination thereof, is configured to apply an open circuit test voltage of substantially less than a welding voltage to the stud and to measure a feedback parameter.

2. The stud welding device of claim 1, wherein the stud welding power controller is configured to enable a welding power level or range in response to a first state of the signal, and the stud welding power controller is configured to disable or prevent the welding power level or range in response to a second state of the signal.

3. The stud welding device of claim 1, comprising an automatic stud welding gun positioning device, a factory automation system configured to position the stud welding gun on a workpiece, a weld cable, a control cable, a workpiece, or any combination thereof.

4. The stud welding device of claim 1, wherein the stud welding power supply is a DC power supply comprising a transformer with a primary side and a secondary side, and wherein the workpiece sensor comprises a voltage sensor connected to the primary side of the transformer.

5. The stud welding device of claim 1, wherein the stud welding power controller is configured to trigger a 2 second or less pulse of welding current through the welding power output at least partially in response to a state of the signal from the workpiece sensor.

6. The stud welding device of claim 1, wherein the stud welding power controller is configured to respond to a state of the signal from the workpiece sensor by, at least in part, preventing the stud welding power supply from conducting a welding current through the welding power output.

7. The stud welding device of claim 1, wherein the signal from the workpiece sensor is indicative of electrical contact between the stud and the workpiece.

8. The stud welding device of claim 1, wherein the workpiece sensor comprises a low voltage power source connected to the welding power output and a voltage sensor connected to the welding power output.

9. The stud welding device of claim 8, wherein the low voltage power source has an open circuit voltage of less than 35 volts when energized, and wherein the signal from the workpiece sensor is at least based on a voltage of the stud measured by the voltage sensor.

10. A welding device, comprising:
  stud welding controller responsive to a signal indicative of generally no contact between a welding stud and a workpiece, wherein the stud welding controller is configured to respond to the signal by at least substantially reducing, disabling, or preventing a welding output from a welding power supply; and
  a workpiece sensor configured to transmit the signal indicative of generally no contact, the workpiece sensor comprising a capacitance sensor, an eddy current sensor, a metal detector, a contact sensor, or a combination thereof.

11. The welding device of claim 10, wherein the stud welding controller is configured to disregard the signal for at least a stud welding duration after the welding power supply provides the welding output.

12. The welding device of claim 10, wherein the stud welding controller is configured to respond to a signal indicative of contact or no contact by transmitting a stud-lifting control signal, triggering a pulse of normal welding current, and transmitting a stud-plunging control signal.

13. The welding device of claim 10, comprising:
  a welding power supply having a welding current lead;
  wherein the workpiece sensor comprises:
    a low voltage DC power source coupled to the welding current lead, wherein the low voltage DC power source has an open circuit voltage of less than 30 volts when energized; and
    a voltage sensor electrically coupled to the welding current lead and communicatively coupled to the stud welding controller, wherein the signal indicative of generally no contact is a signal from the voltage sensor indicating that a voltage of the lead is greater than a threshold voltage.

14. A method, comprising: providing a stud welding power control unit with a stand-by open circuit voltage less than a welding voltage
  when energized, wherein providing the stud welding power control unit comprises providing a stud welding power control unit with a stand-by open circuit voltage less than 35 volts when energized.

15. A method, comprising: providing a stud welding power control unit with a stand-by open circuit voltage less than a welding voltage
  when energized, wherein providing the stud welding power control unit comprises providing a stud welding power control unit with a stand-by test current of less than 100 milliamps.

* * * * *